Dec. 8, 1931.   H. N. BINGHAM   1,835,629
APPARATUS FOR KILLING ROOTS, ETC., IN PLOWED GROUND
Filed Dec. 10, 1930   2 Sheets-Sheet 1
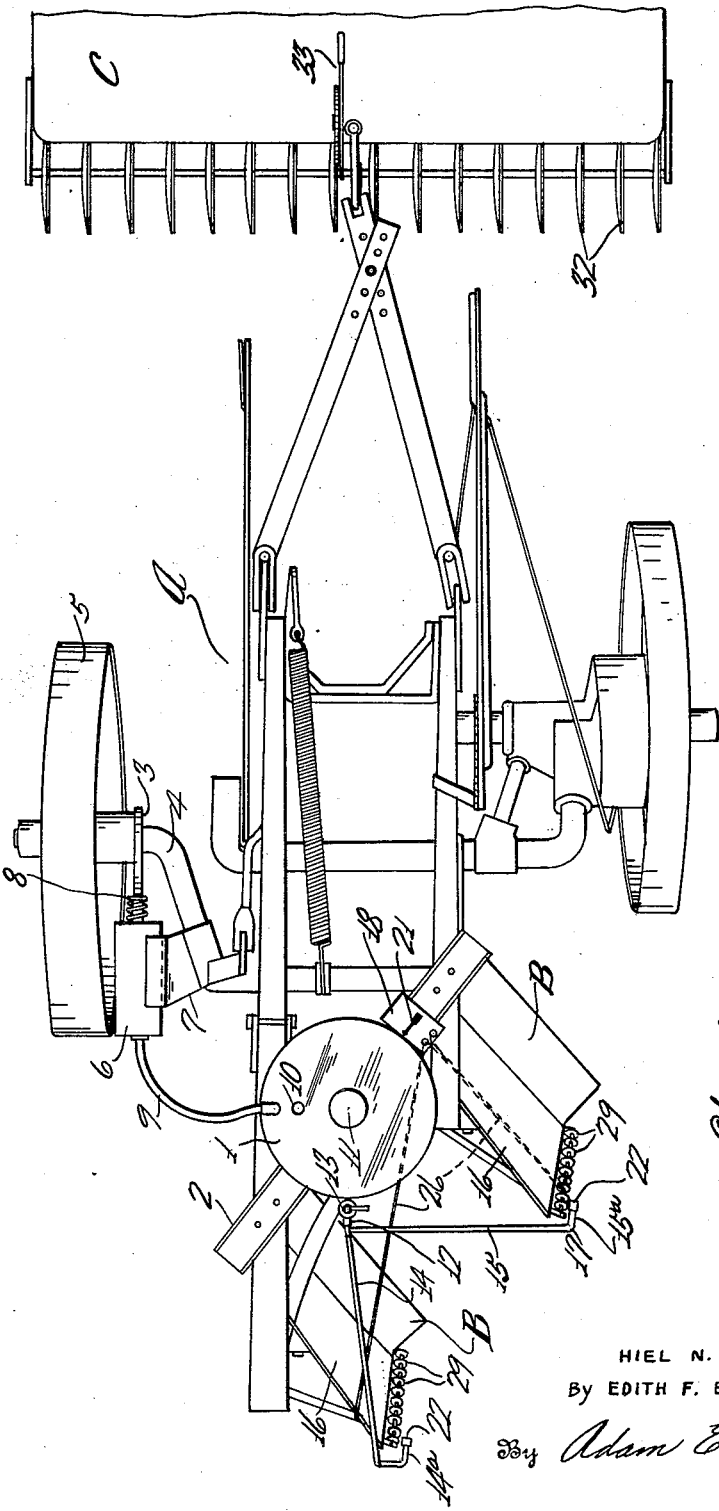
Inventor
HIEL N. BINGHAM, Deceased,
By EDITH F. BINGHAM, Administratrix
By Adam E. Fisher
Attorney Dec. 8, 1931. H. N. BINGHAM 1,835,629
APPARATUS FOR KILLING ROOTS, ETC., IN PLOWED GROUND
Filed Dec. 10, 1930 2 Sheets-Sheet 2
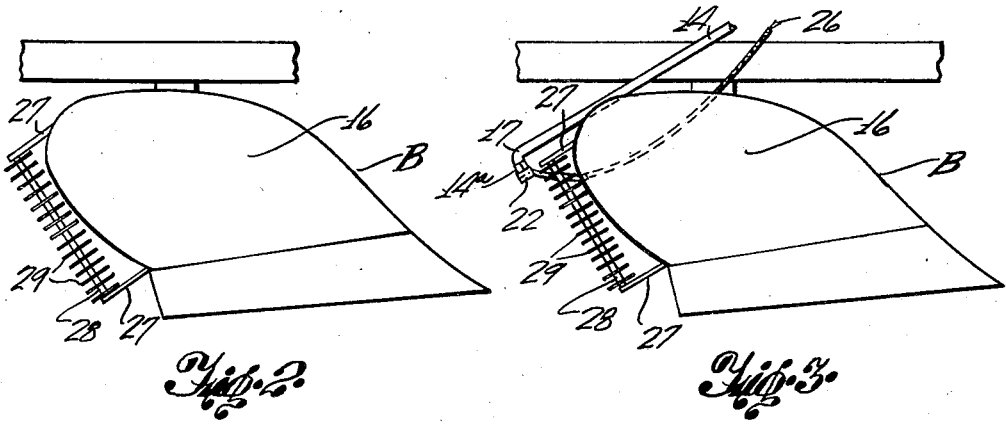
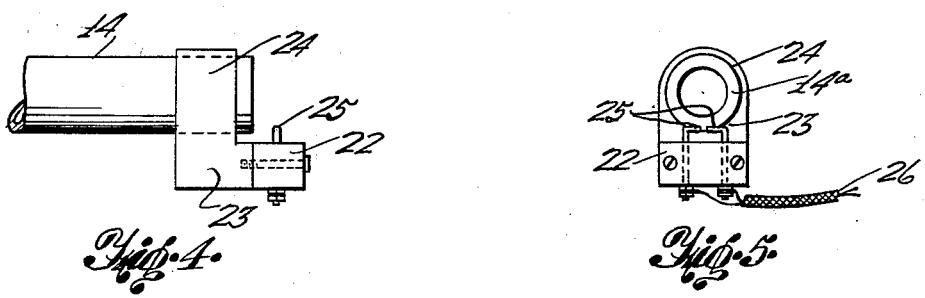
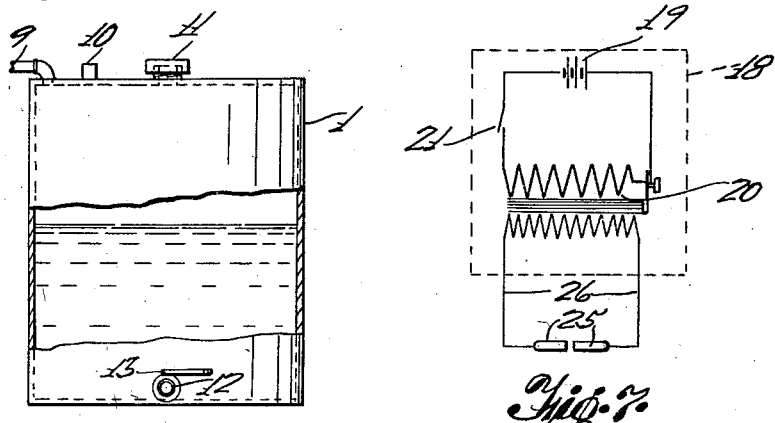
Inventor
HIEL N. BINGHAM, Deceased,
By EDITH F. BINGHAM, Administratrix
By Adam E. Fisher
Attorney Patented Dec. 8, 1931

1,835,629

UNITED STATES PATENT OFFICE

HIEL N. BINGHAM, DECEASED, LATE OF OAKES, NORTH DAKOTA, BY EDITH F. BINGHAM, ADMINISTRATRIX, OF DENVER, COLORADO

APPARATUS FOR KILLING ROOTS, ETC., IN PLOWED GROUND

Application filed December 10, 1930. Serial No. 501,200.

This invention presents an apparatus for killing roots, insects and the like in ground being prepared for planting, simultaneously with the plowing of the ground.

The main object is to provide means for killing the roots of grasses and weeds and for killing insects of all kinds by heat during the act of plowing or cultivating the ground, thus preparing the ground for planting and at the same time ridding it of all injurious elements and conditions.

A further object is to provide a soil sterilizing or insect and weed killing means of the above character in which the heat or flame is applied to the inner or underside of the furrow slice or ground as it is raised and turned by the plow, the flame thus striking directly on the roots of the weeds.

Another object is to provide a soil sterilizing means for attachment to plows and the like comprising a soil splitting or reslicing or spreading element arranged before the heating or firing element thus reslicing and spreading apart the furrow slice and allowing the flame to penetrate deeply thereinto to facilitate the complete killing of the weeds or insects.

In the accompanying drawings the apparatus for carrying out the invention is illustrated for exemplification as mounted upon a tractor plow of conventional form and in the drawings:

Figure 1 is a plan view of the plow, the rear portion of the tractor for drawing the plow and the weed and insect killing means mounted on the plow.

Figure 2 is a detail in elevation of one of the plow shares or bottoms showing a soil spreader or slicer mounted thereon to prepare the soil for the application of the sterilizing heat.

Figure 3 is a view similar to Figure 2 but showing also the heat emitting means and its disposition relative to the plow share or bottom.

Figure 4 is a side view of the heat or flame emitting means and the ignition or lighting device therefor.

Figure 5 is an end view of the structure shown in Figure 4.

Figure 6 is an elevation, partly in section of the fuel tank.

Figure 7 is a diagrammatical wiring plan of the ignition or lighting device.

Referring now more particularly to the drawings the reference character A designates a tractor plow including the two plow shares or bottoms B, and adapted to be drawn by the tractor C only the rear portion or drawn bar of which is shown. Both the plow and tractor are of conventional form and no invention therefor is claimed herein.

In its preferred form the apparatus comprises a fuel tank 1 secured upon the cross bar 2 of the plow frame, the said tank serving to contain the liquid fuel of any suitable form and also air under pressure to force the fuel from the tank. A cam 3 is journaled over the plow axle 4 and is secured to the hub of the land wheel 5 to turn therewith. An air pump 6 of conventional form is secured to the axle 4 by the bracket 7 in such manner that the piston rod 8 of the pump is disposed in operative engagement with the cam 3 for reciprocation thereby as the plow is drawn over the ground. The pump 6 and tank 1 are connected by a flexible air hose or tube 9 whereby air will be pumped into the tank as will be apparent. The tank 1 is provided with a safety valve 10 to permit the escape of air when that in the tank reaches a certain pressure and a removable cap 11 is provided for placing fuel in the tank. A pipe 12 is extended outward near the bottom of the tank 1 and a valve 13 of usual form is provided in this pipe to control the flow of fuel from the tank. The pipe 12 outwardly of the valve 13 branches to provide the fuel feed pipes 14 and 15 which extend to and pass behind the moldboards 16 of the plow bottoms B near the upper corners of the said moldboards. The ends of these pipes 14 and 15 are then bent downwardly as at 17 a short distance behind the rear edge of the moldboards 16. These ends of the pipes are formed into fuel or flame nozzles 14a and 15a so that the fuel as it is discharged from the pipes or nozzles may be ignited and will burn, the flames being directed downwardly behind the rear edges of the plow bottoms and moldboards. Due to the pressure on the fuel in the tank 1 the flame at the ends of the nozzles 14a and 15a will shoot downward along the entire rear edge of the moldboards 16 and the pipes 14 and 15 may be so positioned that the flame will play upon the under side of the furrow slice as it is turned by the moldboards as will be understood.

A battery box 18 is mounted on the plow frame cross bar 2 alongside the tank 1 and contains a battery 19 and conventional ignition or high tension coil 20 illustrated in schematic form in Figure 7. The battery 19 energizes the coil 20 under the control of the switch 21 on the box 18. Blocks 22 of insulation are mounted adjacent the ends of the nozzles 14a and 15a by the brackets 23 which have eyes 24 to receive the ends of the said pipes. Contact or spark points 25 are mounted in the blocks 22 and are connected by wires 26 to the high tension winding of the coil 20, the said spark points 25 being so arranged that a spark will pass between them as the switch 21 is closed, this spark serving to ignite the fuel as it is expelled from the nozzles of the fuel feed pipes as will be understood. It will be noted that the blocks 22 are so disposed that the spark points 25 are offset outwardly from the pipes 14 and 15 to lie out of the direct path of the flame but near enough that the spark will ignite the fuel as described.

Ears or brackets 27 are secured to the rear edges of the moldboards 16 near the upper and lower extremities thereof and these ears are extended rearwardly and angularly downward as shown in Figures 2 and 3. Axles or shafts 28 are journaled through the ends of the ears 27 and a plurality of spaced soil slicing and spreading disks 29 are secured on these axles, the ears 27 supporting the axles in such position that the disks are disposed between the nozzles 14a and 15a and the rear edges of the moldboards 16. The said disks project laterally outward beyond the soil engaging faces of the moldboards and the arrangement is such that the inner and under sides of the furrow slices will be cut and spread open as it passes over the moldboards and before being contacted by the flame emitted by the nozzles 14a and 15a. The flames may thus penetrate deeply into the furrow slices to thoroughly kill all insects and weeds therein. Slicing knives or blades (not shown) may of course be used in lieu of the slicing disks if so desired.

As shown in Figure 1 a disk harrow or cultivator 32 may be arranged at the rear of the tractor C to further slice and prepare the ground for the action of the flame or heat thereon, this disk harrow 32 being of conventional form and having a lever 33 by means of which it may be raised and lowered.

While there is herein set forth a certain preferred arrangement of parts it is understood that the same may be varied in minor details, not departing from the spirit of the invention and within the scope of the appended claims.

What is claimed is:

1. In an apparatus of the purpose described, in combination with a plow including plow shares, a fuel tank mounted on the plow to contain liquid fuel, means for compressing air in the fuel tank to exert a pressure on the fuel therein, pipes extended from the tank to the rear of the said plow shares, the ends of the said pipes being bent downwardly adjacent the upper rear margins of the plow shares and formed at their lower ends to provide flame nozzles, spaced spark contacts operatively mounted near the ends of the said nozzles, and means for impressing a high tension voltage across the said contacts to produce a spark for igniting the fuel.

2. In an apparatus for the purpose described, in combination with a plow including plow shares, a fuel tank mounted on the plow and adapted to contain liquid fuel, means for compressing air in the tank to exert a pressure on the fuel therein, pipes extended from the fuel tank to the said plow shares adjacent the rear edges thereof, the ends of the said pipes being formed at their ends to provide flame nozzles, and cutting disks arranged adjacent the plow shares and forwardly of the said flame nozzles.

3. In an apparatus for the purpose described, in combination with an agricultural implement including plow shares, flame nozzles operatively mounted rearward of the plow shares, means for supplying fuel under pressure to the said flame nozzles, and a plurality of rotatable cutting disks operatively mounted adjacent the said plow shares and forwardly of the said flame nozzles.

4. In an apparatus for the purpose described, in combination with an agricultural implement including plow shares and moldboards, flame emitting means mounted adjacent the rear edges of the moldboards, and directed downwardly along the said rear edges thereof, means for supplying fuel under pressure to the said flame emitting means, and soil slicing and spreading means mounted adjacent the moldboards and forwardly of the said flame emitting means.

5. In an apparatus of the kind described, the combination with a plow of means associated with the plow for splitting the furrow slice at the under side thereof as it is turned by the plow, and separate means for subjecting the split furrow slice to the action of flame and heat at the under side thereof while it is in its elevated position as turned by the plow.

MRS. EDITH F. BINGHAM,
*Administratrix of the Estate of Hiel N. Bingham, Deceased.*